United States Patent
Wu et al.

(10) Patent No.: US 11,657,164 B2
(45) Date of Patent: May 23, 2023

(54) DECENTRALIZED POLICY PUBLISH AND QUERY SYSTEM FOR MULTI-CLOUD COMPUTING ENVIRONMENT

(71) Applicant: EMC IP Holding Company LLC, Hopkinton, MA (US)

(72) Inventors: Pengfei Wu, Shanghai (CN); Stephen J. Todd, Center Conway, NH (US); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 334 days.

(21) Appl. No.: 17/031,282

(22) Filed: Sep. 24, 2020

(65) Prior Publication Data
US 2021/0004473 A1    Jan. 7, 2021

Related U.S. Application Data

(62) Division of application No. 16/048,785, filed on Jul. 30, 2018, now Pat. No. 10,824,740.

(51) Int. Cl.
*H04L 29/06* (2006.01)
*G06F 21/60* (2013.01)
(Continued)

(52) U.S. Cl.
CPC .......... *G06F 21/602* (2013.01); *H04L 9/0637* (2013.01); *H04L 63/0823* (2013.01); *H04L 63/0876* (2013.01); *H04L 63/20* (2013.01)

(58) Field of Classification Search
CPC ............... G06F 21/602; H04L 63/0823; H04L 63/0876; H04L 63/20; H04L 9/0637
See application file for complete search history.

(56) References Cited

U.S. PATENT DOCUMENTS 8,037,349 B2 * 10/2011 Mandagere ......... G06F 11/1435
714/6.2
9,053,124 B1    6/2015 Dornquast et al.
(Continued)

OTHER PUBLICATIONS

Stefan Miltchev et al., Decentralized Access Control in Distributed File Systems, Aug. 13, 2008, ACM, vol. 40, Issue 3, pp. 1-30. (Year: 2008).*

(Continued)

*Primary Examiner* — Luu T Pham
*Assistant Examiner* — Fahimeh Mohammadi
(74) *Attorney, Agent, or Firm* — Ryan, Mason & Lewis, LLP

(57) ABSTRACT

A given policy file is obtained at a publishing node of a decentralized system of nodes, wherein the given policy file defines a policy that applies to at least a subset of nodes in the decentralized system of nodes. The given policy file is sent to a decentralized storage network for storage therein. Storage metadata is received from the decentralized storage network, wherein the storage metadata represents address information associated with storage of the given policy file in the decentralized storage network. The publishing node generates policy file retrieval metadata based on the storage metadata received from the decentralized storage system. The policy file retrieval metadata is sent to a blockchain network for storage therein. One or more querying nodes of the decentralized system of nodes access the blockchain network to obtain the policy file retrieval metadata in order to then retrieve the policy file from the decentralized storage network.

20 Claims, 9 Drawing Sheets

(51) Int. Cl.
*H04L 9/06* (2006.01)
*H04L 9/40* (2022.01)

(56) References Cited

U.S. PATENT DOCUMENTS

| | | | | |
|---|---|---|---|---|
| 9,489,652 | B1* | 11/2016 | Hillyard | G06Q 10/087 |
| 10,735,193 | B1* | 8/2020 | Knas | H04L 9/3239 |
| 2003/0126122 | A1* | 7/2003 | Bosley | G06F 16/134 |
| 2008/0077635 | A1 | 3/2008 | Sporny et al. | |
| 2011/0055621 | A1* | 3/2011 | Mandagere | G06F 11/1453 |
| | | | | 707/E17.014 |
| 2011/0099351 | A1 | 4/2011 | Condict | |
| 2011/0191300 | A1* | 8/2011 | Orenstein | G06F 16/00 |
| | | | | 707/646 |
| 2012/0110651 | A1* | 5/2012 | Van Biljon | H04L 63/102 |
| | | | | 709/201 |
| 2012/0254215 | A1* | 10/2012 | Miyata | G06F 16/148 |
| | | | | 707/E17.014 |
| 2014/0156618 | A1* | 6/2014 | Castellano | G06F 16/2308 |
| | | | | 707/703 |
| 2014/0201541 | A1 | 7/2014 | Paul et al. | |
| 2015/0213049 | A1 | 7/2015 | Kleiman et al. | |
| 2015/0358421 | A1* | 12/2015 | Gupta | H04L 67/10 |
| | | | | 709/202 |
| 2016/0328162 | A1 | 11/2016 | Hayes et al. | |
| 2017/0046526 | A1* | 2/2017 | Chan | G06Q 20/4016 |
| 2017/0171197 | A1* | 6/2017 | Alexander | H04L 9/0825 |
| 2018/0205552 | A1* | 7/2018 | Struttmann | H04L 9/0637 |
| 2019/0036887 | A1* | 1/2019 | Miller | H04L 9/3213 |
| 2019/0114159 | A1 | 4/2019 | D'Souza | |
| 2019/0268139 | A1 | 8/2019 | Kurian | |
| 2019/0303445 | A1* | 10/2019 | Padmanabhan | G06F 16/27 |
| 2019/0325155 | A1 | 10/2019 | Wu et al. | |
| 2021/0203503 | A1* | 7/2021 | Soundararajan | H04L 9/3213 |

OTHER PUBLICATIONS

Mayssa Jemel et al., Decentralized access control mechanism with temporal dimension based on blockchain, Nov. 23, 2017, IEEE, pp. 177-182. (Year: 2017).*

Shangping Wang et al., A Blockchain-Based Framework for Data Sharing With Fine-Grained Access Control in Decentralized Storage Systems, Jun. 29, 2018, IEEE, vol. 6, pp. 38437-38450. (Year: 2018).*

Manoj Parameswaran et al., P2P Networking: An Information-Sharing Alternative, Jul. 2001, IEEE, vol. 34, Issue: 7, pp. 31-38. (Year: 2001).*

P. Maymounkov et al., "Kademlia: A Peer-to-Peer Information System Based on the XOR Metric," International Workshop on Peer-to-Peer Systems, (IPTPS), Mar. 7-8, 2002, pp. 53-65.

Juan Benet, "IPFS—Content Addressed, Versioned, P2P File System (Draft 3)," arxiv: 1407.3561 v1, Jul. 14, 2014, 11 pages.

Satoshi Nakamoto, "Bitcoin: A Peer-to-Peer Electronic Cash System," http://bitcoin.org/bitcoin.pdf, 2008, 9 pages.

* cited by examiner

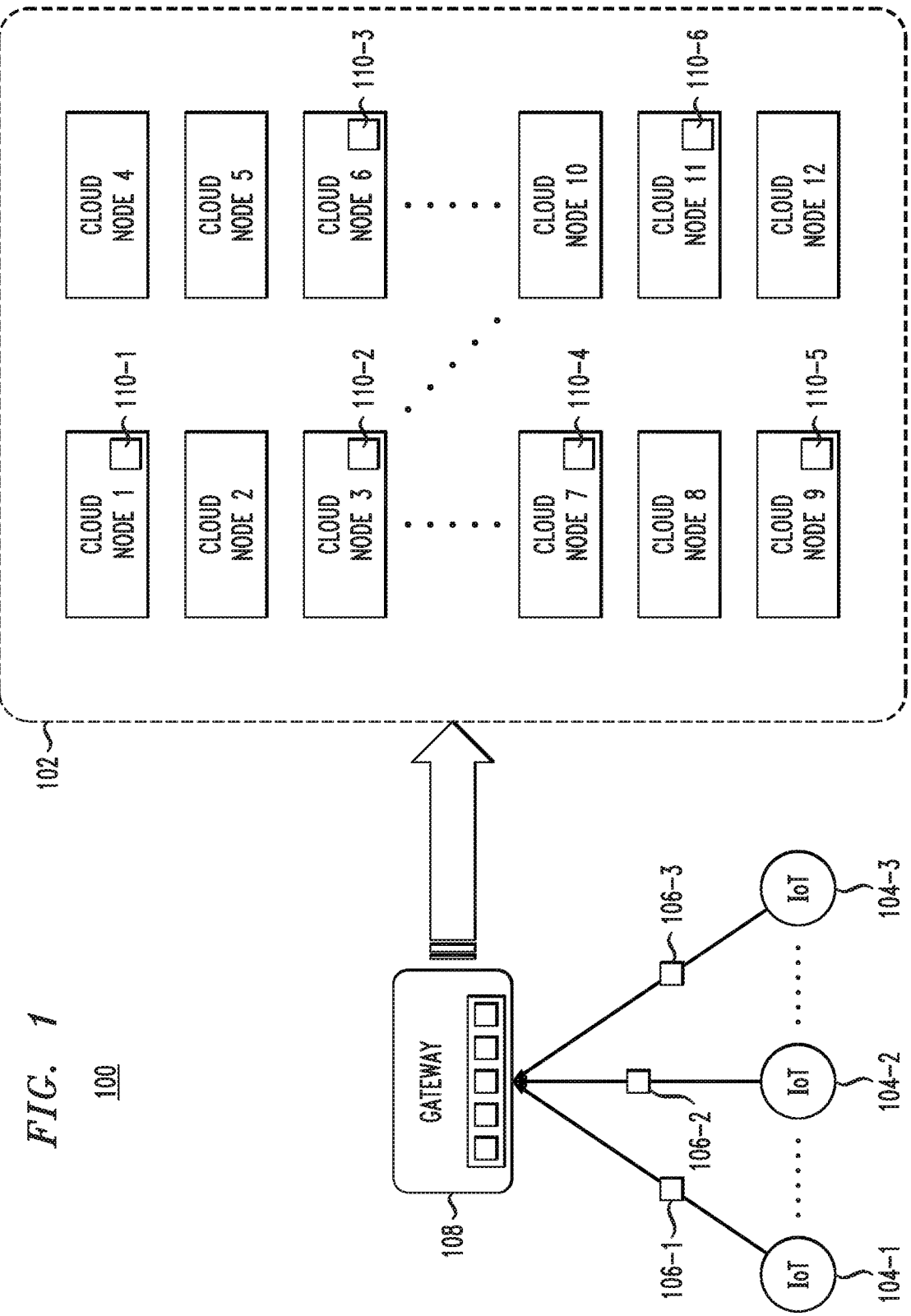

210

200

300

400

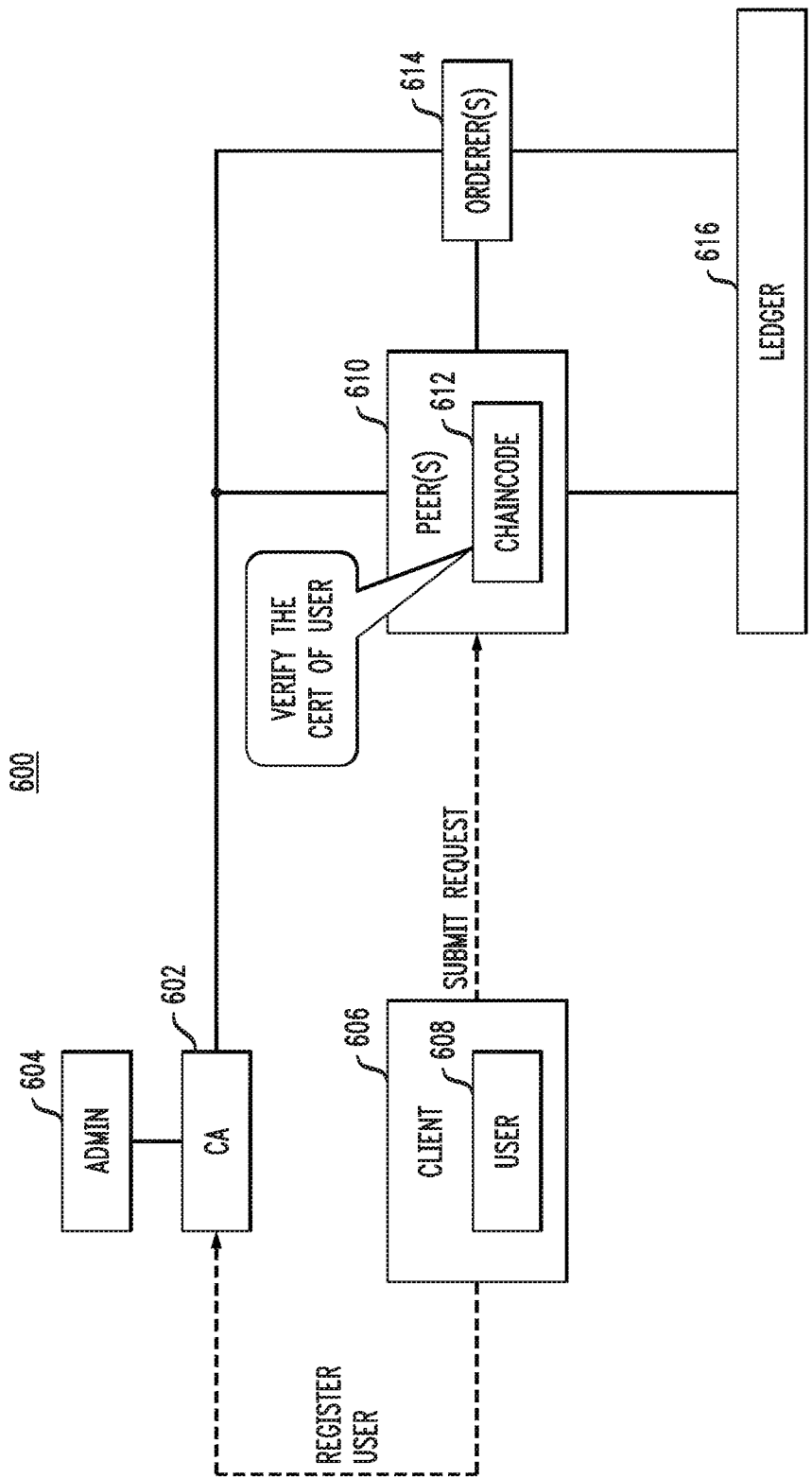

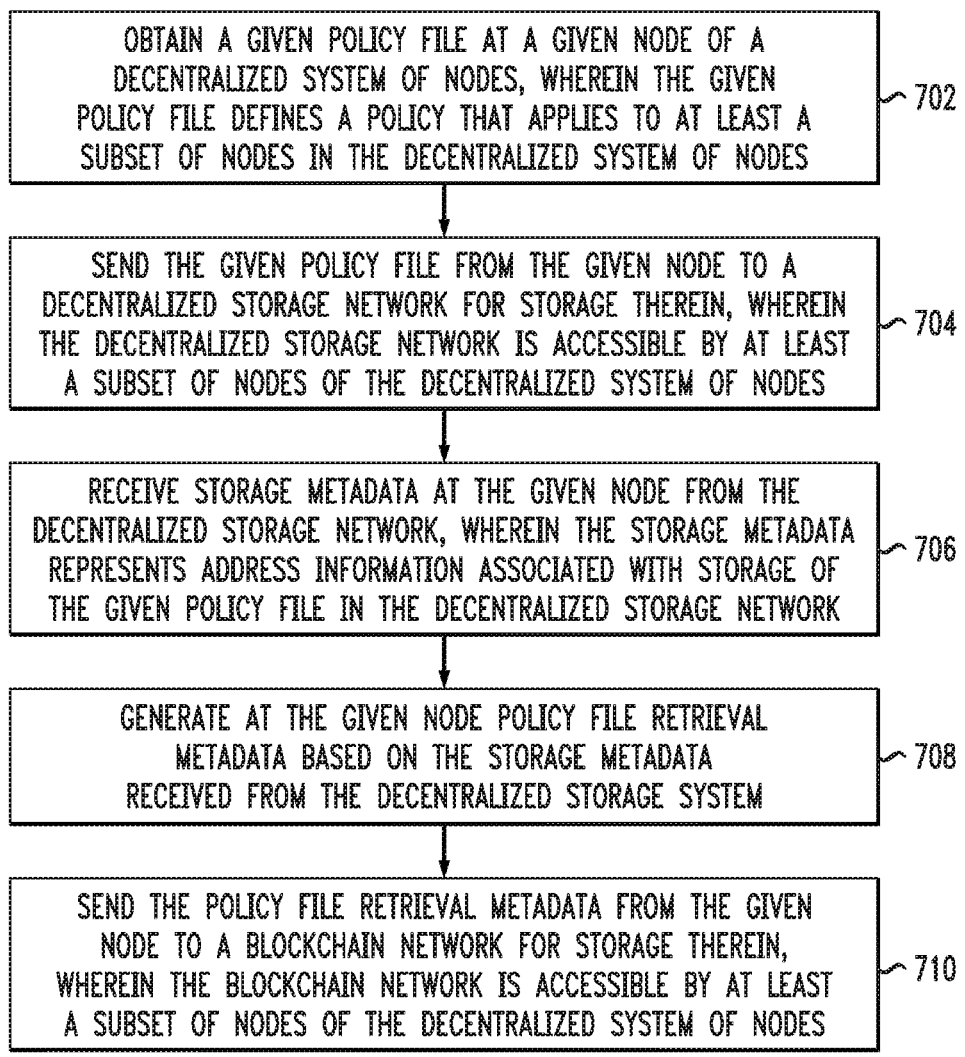

720

DECENTRALIZED POLICY PUBLISH AND QUERY SYSTEM FOR MULTI-CLOUD COMPUTING ENVIRONMENT

CROSS REFERENCE TO RELATED APPLICATION

The present application is a divisional of, and therefore claims priority to, U.S. patent application Ser. No. 16/048,785, entitled "Decentralized Policy Publish and Query System for Multi-Cloud Computing Environment," filed Jul. 30, 2018, the disclosure of which is incorporated by reference herein in its entirety.

FIELD

The field relates generally to multi-cloud computing environments and, more particularly, to data protection and management techniques in such multi-cloud computing environments.

BACKGROUND

Enterprises such as corporations typically utilize a cloud computing environment to manage their data. One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, enterprises may choose to host their data (as well as applications, workloads, services, etc.) on a combination of private and public clouds that form a multi-cloud computing environment. One or more clouds may also be referred to as a "data center." Alternatively, a data center may be comprised of one or more clouds.

The emergence of multi-cloud computing environments increases the need for data protection and management across multiple clouds. However, attempts to provide data protection and management across multiple clouds using existing solutions presents significant challenges for an enterprise.

SUMMARY

Illustrative embodiments of the invention provide decentralized data protection and management techniques in a multi-cloud computing environment. More particularly, one or more illustrative embodiments provide decentralized policy publish and query features of a decentralized data protection and management system.

For example, in one embodiment, a policy publishing method comprises the following steps. A given policy file is obtained at a given node of a decentralized system of nodes, wherein the given policy file defines a policy that applies to at least a subset of nodes in the decentralized system of nodes. The given policy file is sent from the given node to a decentralized storage network for storage therein, wherein the decentralized storage network is accessible by at least a subset of nodes of the decentralized system of nodes. Storage metadata is received at the given node from the decentralized storage network, wherein the storage metadata represents address information associated with storage of the given policy file in the decentralized storage network. The given node generates policy file retrieval metadata based on the storage metadata received from the decentralized storage system. The policy file retrieval metadata is sent from the given node to a blockchain network for storage therein, wherein the blockchain network is accessible by at least a subset of nodes of the decentralized system of nodes.

In another embodiment, a policy querying method comprises the following steps. A request is sent from a given node in a decentralized system of nodes to a blockchain network, wherein the request is associated with a given policy file that defines a policy that applies to at least a subset of nodes in the decentralized system of nodes. Policy file retrieval metadata is received at the given node from the blockchain network in response to the request, wherein the policy file retrieval metadata comprises address information associated with storage of the given policy file in a decentralized storage network. The address information is sent from the given node to the decentralized storage network. The given policy file is received at the given node from the decentralized storage network.

In a further embodiment, a system comprises a plurality of nodes, wherein at least a portion of the nodes are cloud nodes in a multi-cloud computing environment. The system further comprises a decentralized storage network accessible by at least a subset of nodes of the decentralized system of nodes and configured to store one or more policy files that define one or more policies associated with data protection and management of data processed by the plurality of nodes. The system further comprises a blockchain network accessible by at least a subset of nodes of the decentralized system of nodes and configured to store policy file retrieval metadata for obtaining the one or more policy files from the decentralized storage network. Still further, the system comprises an identity management system for providing authenticating credentials to nodes communicating with the blockchain network and the decentralized storage network.

Advantageously, illustrative embodiments provide decentralized policy publish and query features of a decentralized data protection and management system in a multi-cloud computing environment that enable reduced network bottlenecks, a unified view of a given policy, traceable logs of actions associated with the policy, limited data storage associated with the policy, policy integrity checks, as well as other advantages.

These and other features and advantages of the invention will become more readily apparent from the accompanying drawings and the following detailed description.

BRIEF DESCRIPTION OF THE DRAWINGS

FIG. 1 illustrates an exemplary decentralized data protection and management system within which illustrative embodiments are implemented.

FIG. 6 illustrates an identity management methodology of a decentralized data protection and management system, according to an illustrative embodiment.

FIGS. 7A and 7B illustrate a decentralized data protection and management methodology, according to an illustrative embodiment.

DETAILED DESCRIPTION

Figure 2B:
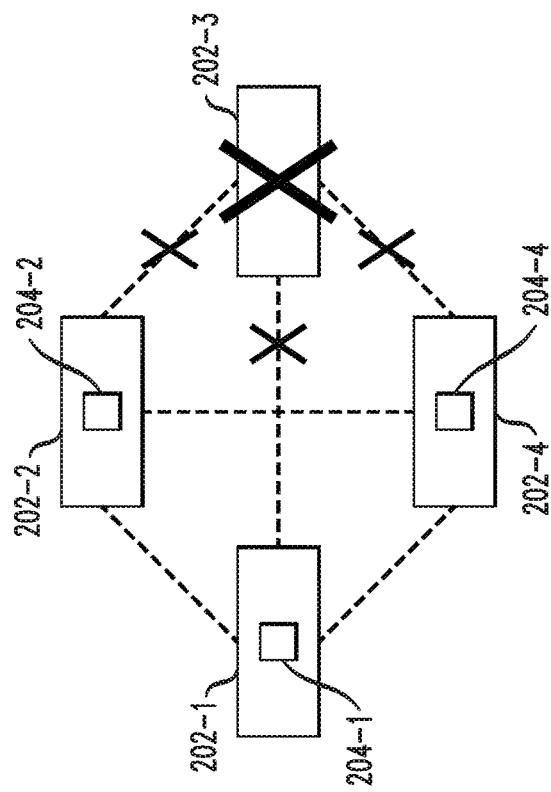
FIGS. 2A and 2B illustrate two exemplary states associated with nodes of the decentralized data protection and management system of FIG. 1.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. As mentioned above, a multi-cloud computing environment employed by an enterprise may comprise two or more clouds (e.g., two or more private clouds, two or more public clouds, or a combination of one or more private clouds and one or more public clouds). The term "enterprise" as used herein is intended to be broadly construed, and may comprise, for example, one or more businesses, one or more corporations or any other one or more entities, groups, or organizations. An "entity" as illustratively used herein may be a person or system.

One type of scalable service that cloud infrastructure typically provides to users is cloud storage. However, it is realized that once users migrate their data to a given cloud platform for storage, so-called "data gravity" prevents them from migrating the data beyond the given cloud platform. Data gravity is the concept that as a data set grows larger, it attracts more software (applications) that utilizes the data toward the physical location of the data. Thus, as more software is located where the data resides, it becomes difficult to migrate the data to another location. This situation inevitably creates data silos and results in so-called "vendor lock-in" (a user is unable or unwilling based on cost to migrate the data from the cloud platform of one cloud provider to another).

Solutions have been proposed for multi-cloud data protection system in an attempt to overcome the data silo and vendor lock-in issues. By way of example only, the U.S. patent application identified as U.S. Ser. No. 15/959,386, entitled "Decentralized Data Protection System for Multi-Cloud Computing Environment," and filed on Apr. 23, 2018, the disclosure of which is incorporated by reference in its entirety herein, discloses a multi-cloud data protection system that addresses data silo, vendor lock-in, as well as other issues. More particularly, in a multi-cloud computing environment with a plurality of cloud platforms wherein each platform has one or more nodes, the cloud platforms are operatively coupled via a unified message bus so that data stored in one cloud is accessible from any other cloud, and thus not limited by APIs dedicated to each of the cloud vendors. Each node in the multi-cloud computing environment comprises a data protection engine, data block storage, and a decentralized metadata database (DMD) component. The DMD framework maintains the metadata of all protected data blocks, so that data in any given node is accessible by any other node using a unified namespace approach. This way, access to data is not limited to a single cloud as in traditional solutions. The DMD framework itself maintains multiple replicas of each metadata record in the DMD components at each of the different nodes. The data protection engine maintains and/or comprises a node state, one or more data protection policy files, and a distributed state monitor. Thus, the data protection engine monitors the state of the protected data and makes decisions and takes actions based on the state and policy information. Ideally, every node in the system should have a unified view of the data protection policy that is in place. However, the system would be improved with a practical way to publish and query the policy files.

Illustrative embodiments provide decentralized policy publishing and querying methodologies for a multi-cloud computing environment. While such decentralized policy publishing and querying methodologies are particularly well suited for implementation in a DMD framework as described above, it is to be appreciated that such techniques are more generally applicable in any decentralized data protection and management system. As will be explained, the decentralized policy publishing and querying methodologies, according to illustrative embodiments, solve the above-mentioned data silo and vendor lock-in issues as well as provide other features such as identity management within a multi-cloud computing environment. The multi-cloud computing environment may include a wide variety of computing resources that form an information processing system. The term "computing resource," as illustratively used herein, can refer to any device, endpoint, component, element, platform, cloud, data center, storage array, client, server, gateway, or other resource, that is part of a multi-cloud computing environment.

Before describing illustrative embodiments of decentralized policy publishing and querying methodologies, some exemplary data protection and management systems will be described in the context of FIGS. 1, 2A, and 2B.

FIG. 1 illustrates a decentralized data protection and management system 100. More particularly, system 100 comprises a multi-cloud computing environment 102 comprised of multiple cloud platforms (public clouds, private clouds, or some combination thereof). Cloud nodes 1 through 12 within multi-cloud computing environment 102 can each be part of a separate cloud platform in some embodiments, while in other embodiments, two or more of cloud nodes 1 through 12 may be part of the same cloud platform.

In the scenario depicted in FIG. 1, it is assumed that computing resources such as Internet-of-Things (IoT) devices 104-1, 104-2, and 104-3 (e.g., sensors, computers, or any other data sources or intermediaries) generate data constantly, e.g., data objects 106-1, 106-2, and 106-3 respectively generated by IoT devices 104-1, 104-2, and 104-3. A gateway device 108 collects data objects 106-1, 106-2, and 106-3 from the IoT devices. It is further assumed that all data objects collected by gateway device 108 are automatically backed up to multiple cloud platforms (e.g., multiple cloud nodes 1 through 12) based on a given data protection policy.

The number of replicas (backup copies of data objects) is defined by a "duplication factor" defined by the given data protection policy. For example, replica data objects 110-1, 110-2, 110-3, 110-4, 110-5, and 110-6 are shown stored on cloud nodes 1, 3, 6, 7, 9, and 11 wherein, given a duplication factor of two, data objects 110-1 and 110-5 are replicas of data object 106-1, data objects 110-2 and 110-4 are replicas of data object 106-2, and data objects 110-3 and 110-6 are replicas of data object 106-3.

With cloud nodes constantly joining and leaving the system 100, the number of replicas is fixed to equal the duplication factor. The system 100 creates new replicas or removes redundant replicas in a fully decentralized manner. The above-referenced U.S. Ser. No. 15/959,386 is one example of a decentralized protection system that can be implemented as part of system 100.

However, it is realized herein that there is no efficient way to publish a policy file in which the duplication factor is defined. Every node in the system 100, including the cloud nodes running on different public clouds (e.g., cloud nodes 1 through 12), gateway nodes (e.g., gateway device 108), analytic server nodes (not expressly shown) and IoT nodes (e.g., IoT devices 104-1, 104-2, and 104-3) in the system cannot query the latest policy file efficiently nor verify that the policy file is actually the latest version.

Note also that the policy may not be a system-wide policy. That is, different nodes in the system may have different policies. For example, for cloud nodes, the policy file may define the manner in which they maintain the number of replicas of the data objects as needed. However, other nodes (e.g., gateway device, IoT devices, etc.) in the system can have policies with different rules.

Figure 2A:
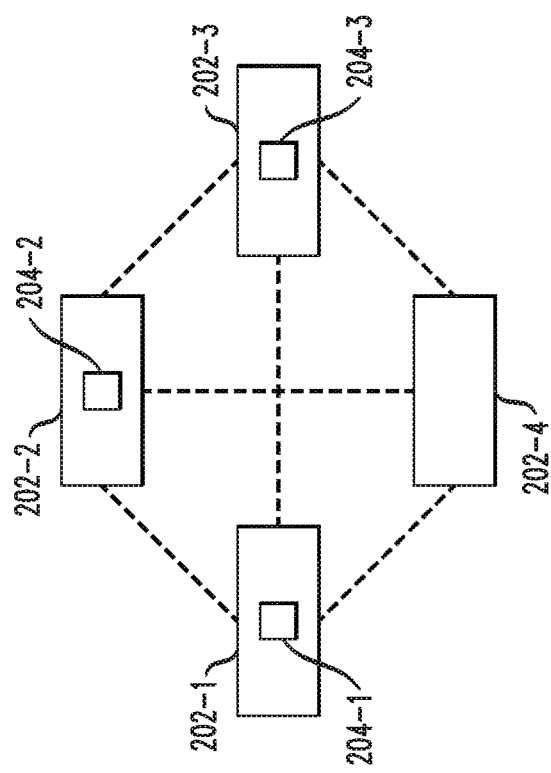

By way of example only, FIGS. 2A and 2B illustrate a policy scenario in the context of cloud nodes 202-1, 202-2, 202-3, and 202-4. More particularly, FIG. 2A shows an initial state 200 of cloud nodes 202-1, 202-2, 202-3, and 202-4. As shown in this example, for a given data object with a duplication factor of three defined in a given policy file, cloud node 202-1 maintains replica data object 204-1, cloud node 202-2 maintains replica data object 204-2, and cloud node 202-3 maintains replica data object 204-3.

FIG. 2B shows a subsequent state 210 following a failure of cloud node 202-3. Failure could be for any reason(s) such as, but not limited to, failure of one or more processing devices associated with cloud node 202-3, failure of one or more communication links associated with cloud node 202-3, etc. Following the failure of cloud node 202-3, there are only two available replicas in the system. In compliance with the policy defining a duplication factor of three (of which the system is assumed to be automatically aware), one more replica of the data object is created on another cloud node, i.e., as shown in FIG. 2B, cloud node 202-4 now maintains replica data object 204-4.

On the other hand, the IoT devices (e.g., 104-1, 104-2, and 104-3 in FIG. 1) do not need to be aware of the number of replicas saved, however, they do need to be aware of when they should download a useful copy of a data object from the cloud and when they should upload their unique copy of a data object to the cloud. As a result, a different policy file should be created for the IoT devices. It should also be noted that while FIG. 1 shows a small number of devices/nodes, in a given data protection and management system, there may typically be hundreds of different devices, and they may also require hundreds of different policies.

Furthermore, it is realized herein that in a decentralized data protection and management system, identity management and authentication is also important, since one node should only see the policy file published to its own node type, while only an authorized identity can publish the policy file. Still further, the integrity of the policy file is also of critical importance. The system should provide that the client can easily validate the integrity of the policy file independently and efficiently. The term "client" as used herein is intended to generally refer to any node (e.g., cloud nodes, gateway nodes, analytic server nodes, IoT nodes, administrator node, and any other nodes) in a decentralized data protection and management system.

There are a variety of ways to manage the policy file in such a decentralized data protection and management system. One approach is to broadcast the policy file to the entire network, while another is to introduce a centralized server to store the policy file such that every node retrieves the policy file from the server.

The problems with these approaches are described below. Note that many of these problems are common to a large decentralized system, and not necessarily limited to a data protection and management system.

Lack of identity management. Identity management may not be a problem if a centralized server is introduced to store the policy file, however, it is very difficult to implement a practical identity management method if the goal is to publish the policy file via broadcasting. It is difficult for the system to prevent an unauthorized identity to publish a false policy file, while it is also very difficult to publish the policy only to the group of nodes who have read access to the policy file.

Single point of failure. Once the centralized server is introduced to the system, the problem of a single point of failure is also introduced. Though the data protection system could be decentralized, the policy server is centralized. The failure of the policy server would heavily affect the entire system. For example, in the case off a policy server failure, a new policy file would not be published, and nodes would not be able to retrieve a new policy file from the server.

High latency to query the policy. In the case of a centralized solution, all the clients should send the query request to the centralized server, whose performance is clearly limited by computation power and network bandwidth. Note that a given system could typically have hundreds of thousands of clients, including IoT devices, gateways, cloud nodes, etc. In the case of broadcasting, clients cannot actively submit a query request, since the clients would likely be unaware of which node to send the query request.

Lack of unified view of the policy. In the case of broadcasting, it is very difficult, if not impossible, to make sure that all the clients have a unified view of the policy. It is difficult to make sure that every client actually receives the policy, and it is also very difficult to make sure that every client receives the policy files in a desired order. It is possible that different clients get different versions of the policy file at the same time.

Lack of traceability of the policy file. In the case of broadcasting, there is no log for the history of the policy file, making it difficult for the clients to trace the history of the policy file and possibly take action if needed. Broadcasting the policy file also introduces complexity for the network administrator to monitor the network.

Unable to query policy file. In the case of broadcasting, clients cannot actively retrieve the policy file, they can only wait for the new policy file to be published. However, this is problematic. For example, new clients joining the network cannot proactively obtain the policy file. In the case of clients missing a broadcasting message either due to failure of the network or a reboot, there is also no way for the client to become aware of the missed policy file and actively retrieve it.

Integrity check of the policy file. It is realized herein that it is critical for the client to make sure that the policy file has not been tampered with, either due to system failure or deliberately. However, it is difficult to implement this feature in a broadcasting-based system.

Given the complexities and challenges described above, illustrative embodiments provide for the use of a combination of a blockchain network and content-addressed decentralized file system as will be further explained below in the context of FIGS. 3-6. As used in the illustrative descriptions herein, a client can refer to any device or node in a decentralized data protection and management system such as, but not limited to, cloud nodes 1 through 12 in multi-cloud computing environment 102, IoT devices 104-1, 104-2, and 104-3, and gateway device 108 in system 100 of FIG. 1. Also, a client refers to a node of an administrator seeking to publish a policy file as will be further explained below.

Figure 3:
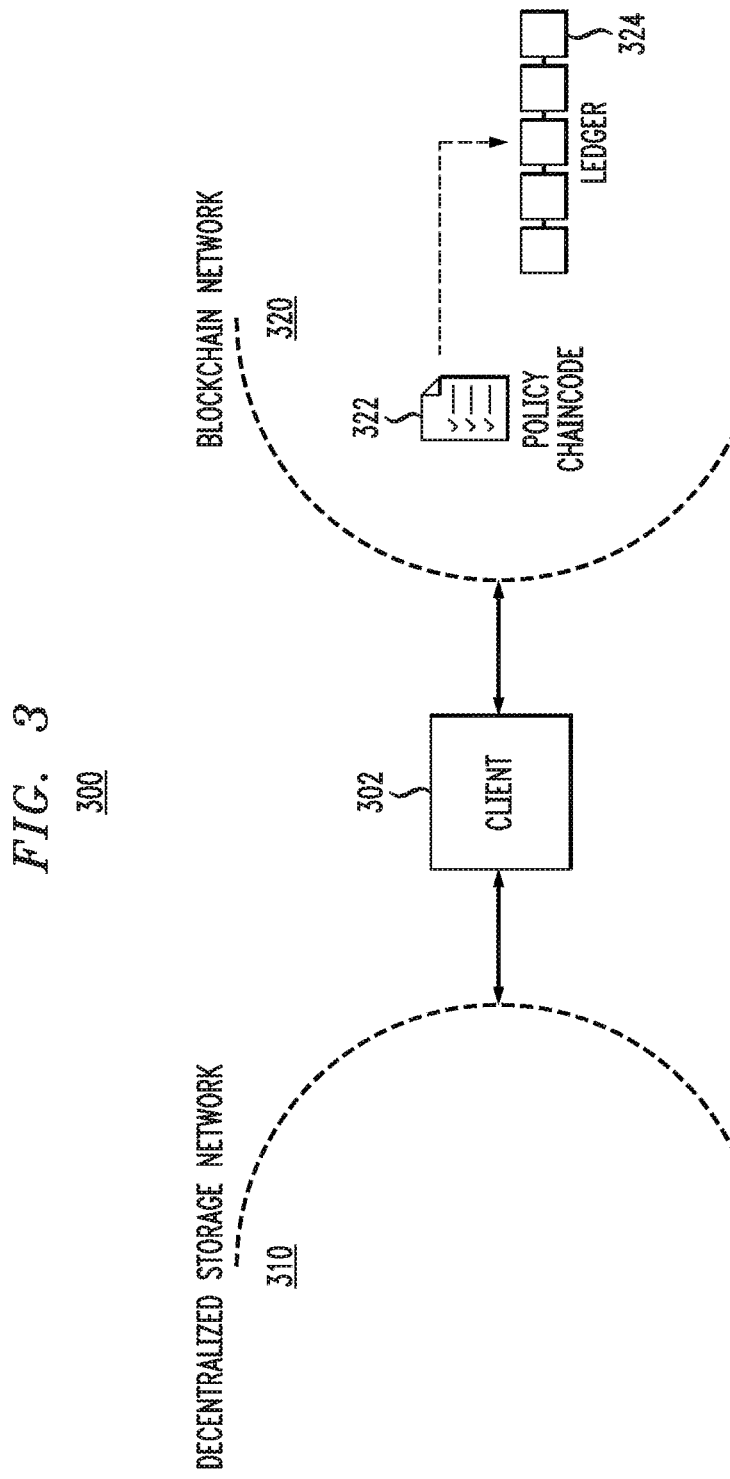
FIG. 3 illustrates decentralized policy publish and query features of a decentralized data protection and management system, according to an illustrative embodiment.

FIG. 3 illustrates decentralized policy publish and query features of a decentralized data protection and management system 300, according to an illustrative embodiment. More particularly, FIG. 3 depicts two networks for implementing a policy publishing and query system according to illustrative embodiments. As shown, a client 302 is operatively coupled to a decentralized storage network (DSN) 310 and a blockchain network 320 which utilizes policy chaincode 322 to manage blockchain ledger 324. Chaincode is a term that describes one or more software programs that run on top of the blockchain ledger 324 to implement business logic associated with the ledger.

In one or more illustrative embodiments, blockchain network 320 is used as a decentralized message bus and logs all policy publishing activities (e.g., history of policy files). DSN 310 is used to store the policy file, making the policy file retrievable by each client (node) in the system. The address of the policy file in DSN 310 is published and queried via the blockchain network 320.

In one or more illustrative embodiments, DSN 310 can be implemented via an Interplanetary File System (IPFS) protocol. More particularly, IPFS is an open-source protocol that provides a decentralized method of storing and sharing files relying on a content-addressable, peer-to-peer hypermedia distribution. The compute nodes in an IPFS network form a distributed file system. A given one of the IPFS compute nodes resides on client 302 (or client 302 otherwise has access to an IPFS compute node). The IPFS protocol was developed to replace the HyperText Transfer Protocol (HTTP) of the Internet which relies on location addressing (i.e., using Internet Protocol (IP) addresses to identify the specific computing resource that is hosting a desired data set). As such, with HTTP, the subject data set must be retrieved from the computing resource where it originated or some computing resource within the content delivery network (CDN) each time the data set is requested.

IPFS operates by operatively coupling, devices/nodes with the same system of files, More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges objects based on a key-value data store. Any type of content can be inserted into the data sharing system, and the system returns a key (i.e., in the form of a hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system.

In one example, the IPFS system is further described in J. Benet, "IPFS—Content Addressed, Versioned, P2P File System," 2014, the disclosure of which is incorporated by reference herein in its entirety. However, illustrative embodiments are not limited to this particular data storage network and alternative systems may be employed.

In one or more illustrative embodiments, the blockchain network 320 can be implemented via a distributed ledger system. As used herein, the terms "blockchain," "ledger" and "blockchain ledger" may be used interchangeably. As is known, the blockchain or distributed ledger protocol is implemented via a distributed, decentralized computer network of compute nodes. A given one of the blockchain compute nodes resides on client 302 (or client 302 otherwise has access to a blockchain compute node). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In digital ledger technologies such as blockchain, an underlying consensus algorithm is typically used to validate new transactions before they are added to the distributed ledger. Typically, for example, the new transaction is broadcast to all nodes within the network, inspected, a consensus is reached, and the entry is formally committed to the blockchain based on whether consensus is reached that the entry is validated.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value.

In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

To facilitate the explanation, in accordance with one illustrative embodiment, IPFS is assumed to be the underlying DSN 310, and Hyperledger Fabric is assumed to be the underlying blockchain network 320.

Figure 4:
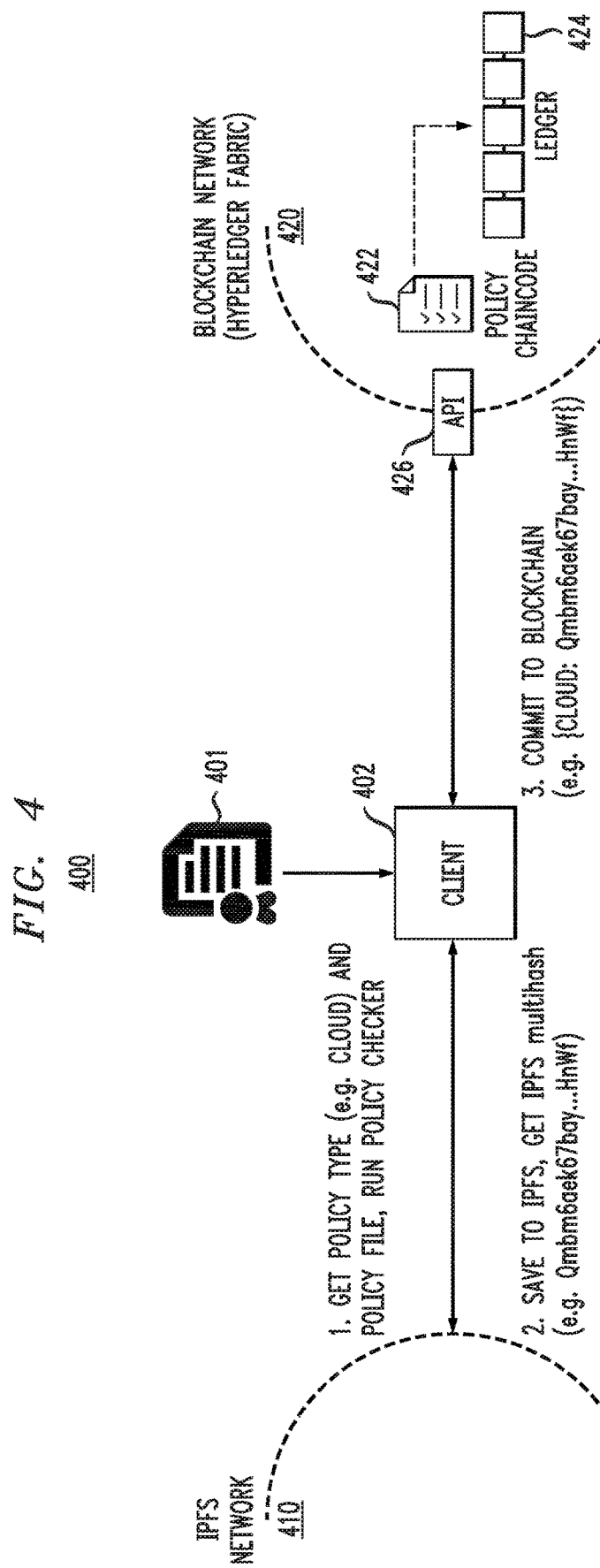
FIG. 4 illustrates a policy publish methodology of a decentralized data protection and management system, according to an illustrative embodiment.

A decentralized policy publishing methodology according to an illustrative embodiment is depicted in FIG. 4. Similar to FIG. 3, a client 402 is operatively coupled to a DSN, i.e., IPFS 410, and operatively coupled to a blockchain network, i.e., Hyperledger Fabric 420 with policy chaincode 422 and ledger 424 via an application programming interface (API) 426.

More particularly, as shown in methodology 400 in FIG. 4, an administrator prepares a new policy file 401 of a given policy type (e.g., cloud), and then publishes the policy file 401 with policy type to the IPFS network 410.

As shown, an administrator client (node) 402 gets the policy file 401 and type from the administrator in step 1. In addition, a policy check can be performed in step 1. For example, client 402 can optionally run some grammar check and integrity check of the policy file 401 before sending it to the IPFS network 410.

In step 2, client 402 sends the policy file 401 and type to IPFS network 410 and obtains the IPFS address of the policy file 401 from IPFS network 410. The client 402 then prepares a key/value pair of data, where the key is the policy type (for example, if the policy is used for the cloud nodes, the policy type is 'cloud'), and the value is the IPFS address of the new policy file.

In step 3, the client 402 then submits the key/value pair to the blockchain network 420 (i.e., commit to blockchain). The peers of the blockchain network 420 (e.g., each node in the system that participates in the blockchain network) independently verify the identity of the policy publisher (identity of client 402) and the policy file 401 itself. If the identity of the policy publisher and the policy file 401 itself are verified, the peers accept the request and record the information in a new block (through API 426 into ledger 424 via policy chaincode 422).

Figure 5:
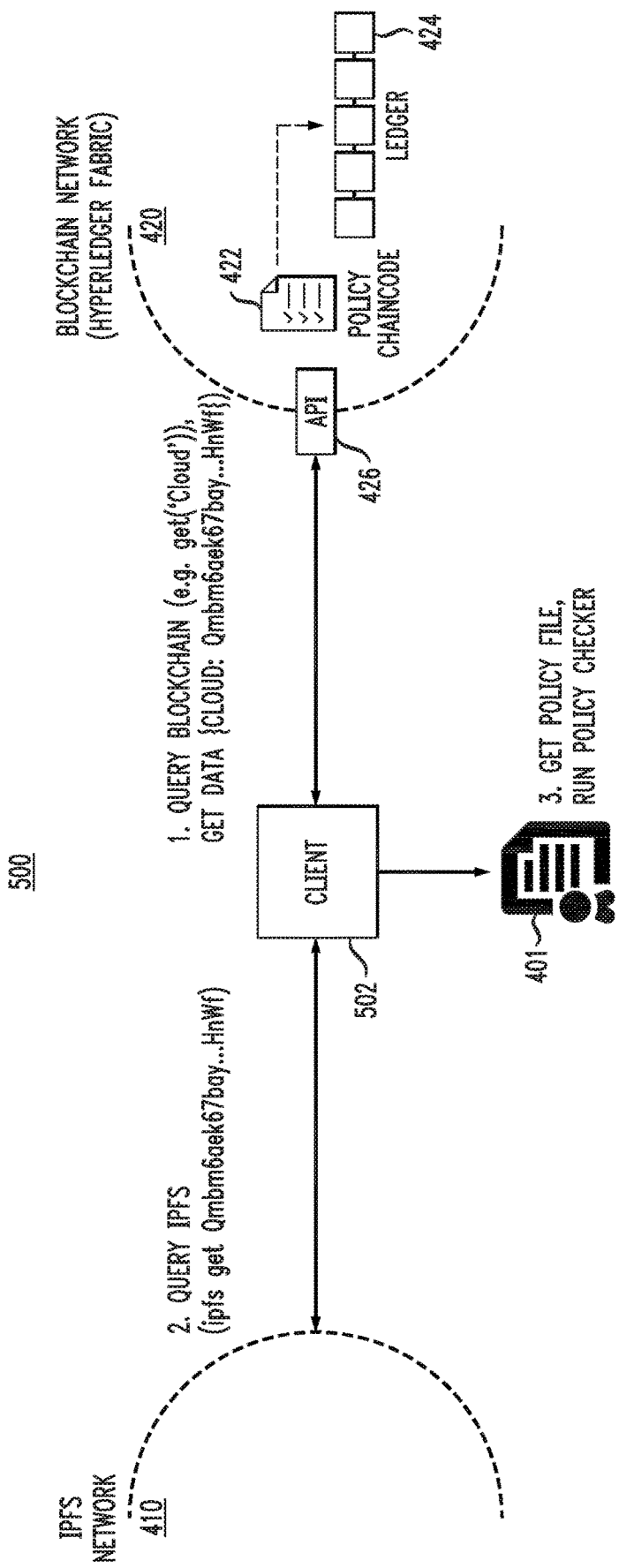
FIG. 5 illustrates a policy query methodology of a decentralized data protection and management system, according to an illustrative embodiment.

FIG. 5 illustrates a policy query methodology of a decentralized data protection and management system, according to an illustrative embodiment. More particularly, as shown in methodology 500 in FIG. 5, the query operation is the reverse of the publishing operation of FIG. 4. It is assumed here that a client (node) other than the policy publisher (client 402 in FIG. 4) is performing the query operation and, thus, the query client is denoted as client 502 in FIG. 5. However, it is possible in some scenario that the query client is the same client that published the policy.

In step 1, client 502 submits a query request to blockchain network 420 providing the policy type (e.g., the cloud type). If the identity check passed (which will be explained further below), client 502 gets the key/value pair, where the value is the IPFS address of the required policy file.

In step 2, client 502 uses the IPFS address to retrieve the policy file 401 from IPFS network 410.

In step 3, client 502 has the new policy file 401. Client 502 can optionally run some grammar check and integrity check of the policy file 401 before actually executing it.

Advantageously, in some embodiments, during the new policy publishing stage (FIG. 4), the peers on blockchain network 420 run chaincode (part of 422) to verify independently whether or not the new policy file 401 meets basic requirements. On the other hand, during the policy querying stage (FIG. 5), client 402 can use the content-based hash to check the integrity of the policy file 401, making sure that the file has not been tampered with.

FIG. 6 illustrates an identity management methodology of a decentralized data protection and management system, according to an illustrative embodiment. More particularly, a central authority (CA) 602 is introduced into the system (part of system 300 in FIG. 3 implementing methodologies 400 and 500 of FIGS. 4 and 5, respectively) to provide an identity management feature based on Public Key Infrastructure (PKI) in one or more illustrative embodiments. One or more administrators 604 oversee the CA operations. A client 606 associated with a given user 608 registers with CA 602. Note that client 606 can be any client in the system (e.g., publishing client 402, querying client 502). Once registered in the identity management system, client 606 can submit a request to one or more peers 610 (e.g., blockchain network 420 of FIG. 4) which process the request using chaincode 612 and orderer(s) 614 in conjunction with ledger 616.

It is to be appreciated that the public key (of a public key/private key pair) of CA 602 is shared by all peers 610, so that every peer on the chain can verify a certificate provided by client 606 (in its request) independently. More particularly, user 608 requests access to ledger 616 from CA 602. CA 602 issues a certificate accordingly, where the certificate is digitally signed using the private key of CA 602. User 608 tries to access (read/write) ledger 616 by providing the certificate issued by CA 602. All peers 610 can verify the certificate independently and act accordingly. Note that orderer 614 (e.g., one orderer 614 per peer 610 in an illustrative embodiment) is configured to keep track of policy file versions and how each peer receives them as needed. Recall above that in some cases different clients should get different versions of the policy file at the same time.

Many advantages are realized from the above-described policy publishing and query system. Some of these advantages include the following.

No network bottleneck. Since no centralized server is introduced into the system, the policy publish and query requests are distributed to peers. Besides, as IPFS is a decentralized, peer to peer network, the policy file is transferred among peers.

Unified view of the policy. Blockchain technology provides consistency of the system-wide state of the data stored on the ledger, as long as the underlying consensus algorithm is not compromised. All clients (with access granted) can actively query the blockchain and get the latest policy file from the blockchain and IPFS. Therefore, in accordance with illustrative embodiments, there is no need to wait for a broadcast message or to make a request to a centralized policy server.

Traceable logs. All modifications of the policy files are logged on the blockchain, which is immutable. Thus, activities by the administrator to publish policy files are globally noticed. Peers will also be aware of any misbehavior of the administrator, so that actions or human intervention can be taken. On the other hand, the logs provide valuable information to the administrator to trace what happens if problems surface.

Integrity check and small data on chain. In one or more illustrative embodiments, the information saved on the blockchain is only the content-based address of the policy file, so that only a small piece of data is saved on the ledger, preventing the size of the chain from growing too quickly. At the same time, the integrity check of the policy file can be done independently and easily by all clients. Every client can check the integrity of the policy file by verifying whether or not the hash digest of the policy file is exactly the same with the content-based address.

Figure 7B:
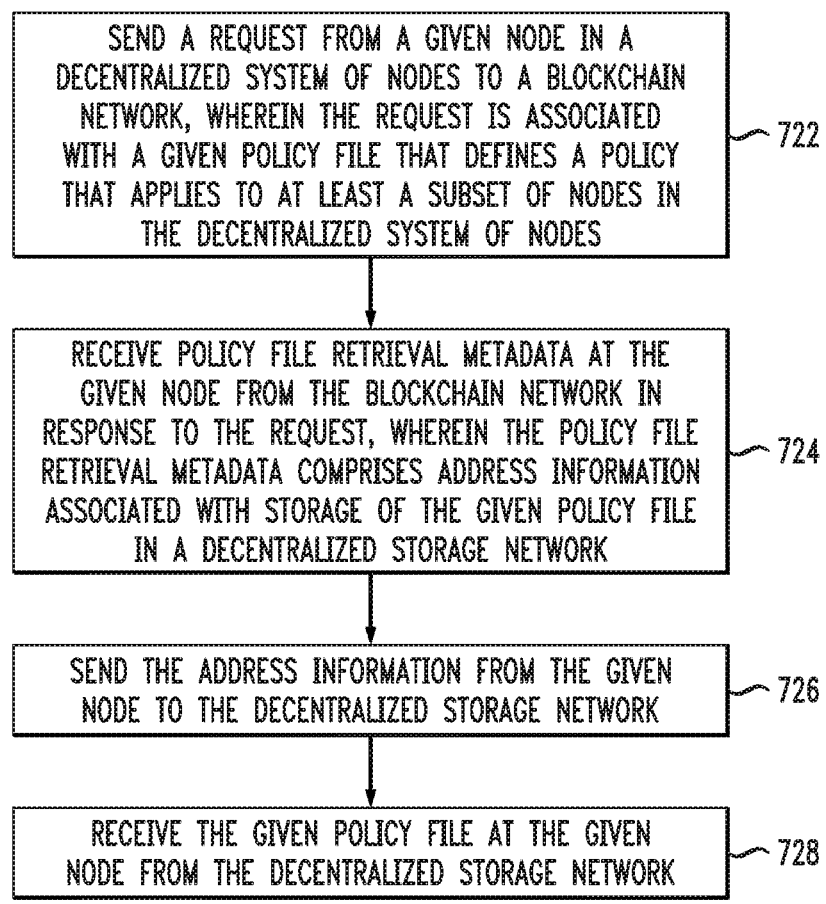

Given the illustrative description of policy publishing and querying techniques herein, FIGS. 7A and 7B depict a methodology for decentralized data protection and management in a multi-cloud computing environment, according to an illustrative embodiment.

FIG. 7A illustrates a policy publishing method 700. In step 702, a given policy file is obtained at a given node of a decentralized system of nodes, wherein the given policy file defines a policy that applies to at least a subset of nodes in the decentralized system of nodes. In step 704, the given policy file is sent from the given node to a decentralized storage network for storage therein, wherein the decentralized storage network is accessible by at least a subset of nodes of the decentralized system of nodes. In step 706, storage metadata is received at the given node from the decentralized storage network, wherein the storage metadata represents address information associated with storage of the given policy file in the decentralized storage network. In step 708, the given node generates policy file retrieval metadata based on the storage metadata received from the decentralized storage system. In step 710, the policy file retrieval metadata is sent from the given node to a blockchain network for storage therein, wherein the blockchain network is accessible by at least a subset of nodes of the decentralized system of nodes.

FIG. 7B illustrates a policy querying method 720. In step 722, a request is sent from a given node in a decentralized system of nodes to a blockchain network, wherein the request is associated with a given policy file that defines a policy that applies to at least a subset of nodes in the decentralized system of nodes. In step 724, policy file retrieval metadata is received at the given node from the blockchain network in response to the request, wherein the policy file retrieval metadata comprises address information associated with storage of the given policy file in a decentralized storage network. In step 726, the address information is sent from the given node to the decentralized storage network. In step 728, the given policy file is received at the given node from the decentralized storage network.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with decentralized policy publishing and querying functionality will now be described in greater detail with reference to FIGS. 8 and 9. Although described in the context of system 100, these platforms may also be used to implement at least portions of other information processing systems in other embodiments.

Figure 8:
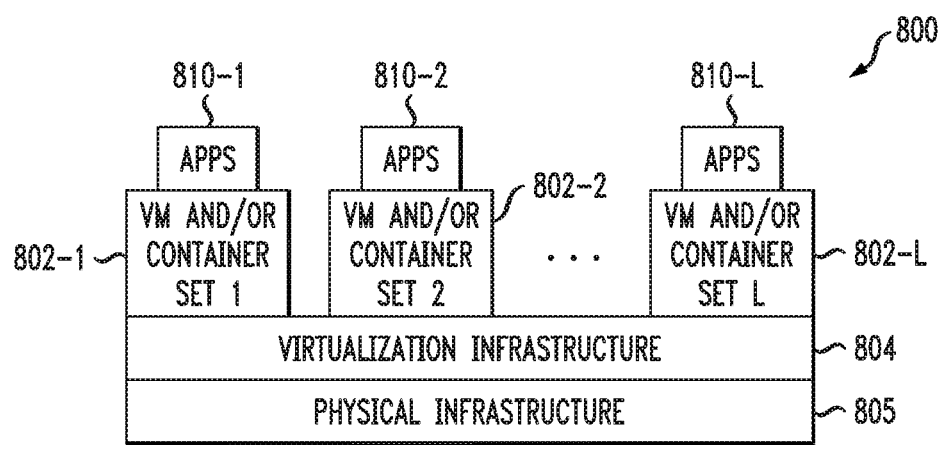
FIGS. 8 and 9 illustrate examples of processing platforms that may be utilized to implement at least a portion of a decentralized data protection and management system, according to illustrative embodiments.
Figure 9:
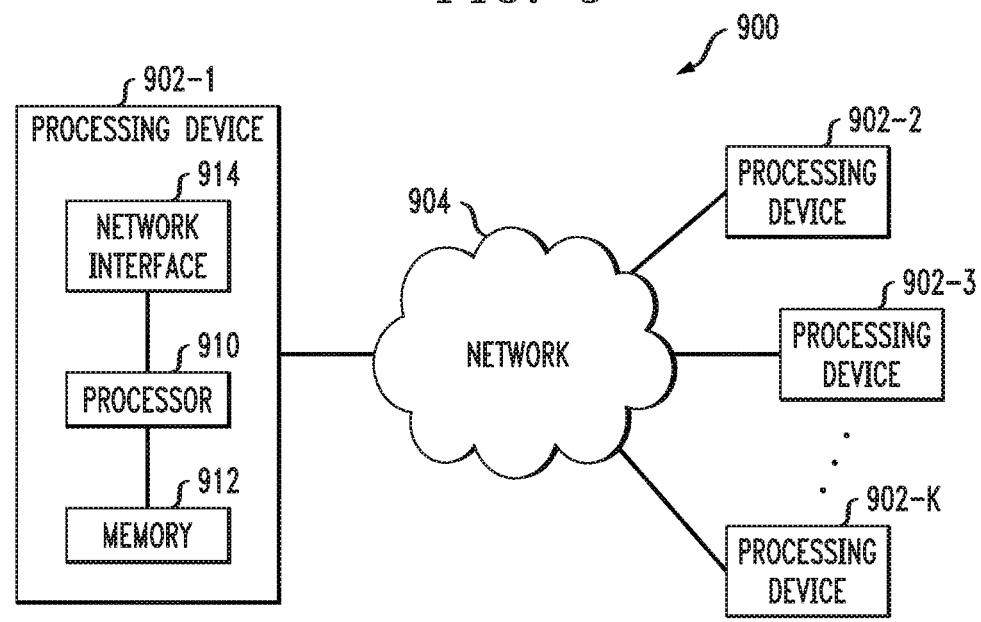

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide metadata loading control functionality of the type described above for one or more processes running on a given one of the VMs. For example, each of the VMs can implement metadata loading control functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide decentralized policy publishing and querying functionality of the type described above for one or more processes running on different ones of the containers. For example, a container host device supporting multiple containers of one or more container sets can implement one or more instances of decentralized policy publishing and querying logic for use in implementing the functionalities described herein.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the decentralized policy publishing and querying functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, decentralized policy publishing and querying processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   sending a request from a given node in a decentralized system of nodes to a blockchain network, wherein the request is associated with a given policy file that defines a policy that applies to at least a subset of nodes in the decentralized system of nodes;
   receiving policy file retrieval metadata at the given node from the blockchain network in response to the request, wherein the policy file retrieval metadata comprises address information associated with storage of the given policy file in a decentralized storage network, the address information comprises a content-based address generated for the given policy file, and the content-based address comprises a computed hash value of the given policy file;
   sending the address information from the given node to the decentralized storage network; receiving the given policy file at the given node from the decentralized storage network; and
   verifying an integrity of the given policy file by comparing the content-based address to a hash digest of the given policy file to determine whether the hash digest is the same as the content-based address;
   wherein the policy file retrieval metadata comprises a key-value pair and the key of the key-value pair comprises a policy type associated with the given policy file;
   wherein the request sent from the given node to the blockchain network comprises a command specifying the policy type associated with the given policy file; and
   wherein the given node is implemented via at least one processing device comprising a processor coupled to a memory.

2. The method of claim 1, wherein the value of the key-value pair comprises the content-based address generated for the given policy file.

3. The method of claim 1, wherein the given policy file defines one or more data protection and management rules associated with data stored by one or more nodes of the decentralized system of nodes.

4. The method of claim 1, further comprising the given node:
obtaining at least one authenticating credential from an identity management system; and
providing the authenticating credential with the request sent to the blockchain network and the address information sent to the decentralized storage network.

5. The method of claim 4 wherein the at least one authenticating credential comprises a certificate digitally signed by the identity management system.

6. An apparatus comprising at least one processing device, wherein the at least one processing device comprises a processor coupled to a memory configured to enable the given node to perform the steps of claim 1.

7. The method of claim 1 wherein the given node is a cloud node in a multi-cloud computing environment.

8. An article of manufacture comprising a non-transitory processor-readable storage medium having stored therein program code of one or more software programs, wherein the program code when executed by at least one processing device causes the given node to perform the steps of:
sending a request from a given node in a decentralized system of nodes to a blockchain network, wherein the request is associated with a given policy file that defines a policy that applies to at least a subset of nodes in the decentralized system of nodes;
receiving policy file retrieval metadata at the given node from the blockchain network in response to the request, wherein the policy file retrieval metadata comprises address information associated with storage of the given policy file in a decentralized storage network, the address information comprises a content-based address generated for the given policy file, and the content-based address comprises a computed hash value of the given policy file;
sending the address information from the given node to the decentralized storage network;
receiving the given policy file at the given node from the decentralized storage network; and
verifying an integrity of the given policy file by comparing the content-based address to a hash digest of the given policy file to determine whether the hash digest is the same as the content-based address;
wherein the policy file retrieval metadata comprises a key-value pair and the key of the key-value pair comprises a policy type associated with the given policy file;
wherein the request sent from the given node to the blockchain network comprises a command specifying the policy type associated with the given policy file; and
wherein the given node is implemented via at least one processing device comprising a processor coupled to a memory.

9. The article of manufacture of claim 8, wherein the value of the key-value pair comprises the content-based address generated for the given policy file.

10. The article of manufacture of claim 8, wherein the given policy file defines one or more data protection and management rules associated with data stored by one or more nodes of the decentralized system of nodes.

11. The article of manufacture of claim 8, further comprising the given node:
obtaining at least one authenticating credential from an identity management system; and
providing the authenticating credential with the request sent to the blockchain network and the address information sent to the decentralized storage network.

12. The article of manufacture of claim 11 wherein the at least one authenticating credential comprises a certificate digitally signed by the identity management system.

13. The article of manufacture of claim 8 wherein the given node is a cloud node in a multi-cloud computing environment.

14. A decentralized system comprising:
a plurality of nodes, wherein at least a portion of the nodes are cloud nodes in a multi-cloud computing environment;
a decentralized storage network accessible by at least a subset of nodes of the decentralized system of nodes and configured to store one or more policy files that define one or more policies associated with data protection and management of data processed by the plurality of nodes;
a blockchain network accessible by at least a subset of nodes of the decentralized system of nodes and configured to store policy file retrieval metadata for obtaining the one or more policy files from the decentralized storage network, wherein the policy file retrieval metadata for the one or more policy files comprises address information associated with storage of respective policy files of the one or more policy files in the decentralized storage network, and wherein the
address information comprises a content-based address generated for each of the respective policy files, and the content-based address comprises a computed hash value of each the respective policy files; and
an identity management system for providing authenticating credentials to nodes communicating with the blockchain network and the decentralized storage network;
wherein at least the subset of nodes is configured to verify an integrity of the respective policy files by comparing the content-based address for each of the respective policy files to a hash digest of each of the respective policy files to determine whether the hash digest is the same as the content-based address;
wherein the policy file retrieval metadata for the one or more policy files comprises one or more key-value pairs and the key of a key-value pair comprises a policy type associated with a respective policy file;
wherein the blockchain network receives requests from at least the subset of nodes, and the requests are associated with the one or more policy files;
wherein at least one of the requests comprises a command specifying the policy type associated with the respective policy file; and
wherein the decentralized system is implemented by a set of processing devices, each comprising a processor and a memory.

15. The decentralized system of claim 14, wherein the value of the key-value pair comprises a content-based address generated for the respective policy file.

16. The decentralized system of claim 14, wherein the authenticating credentials each comprise a certificate digitally signed by the identity management system.

17. The decentralized system of claim 14 wherein the multi-cloud computing environment comprises at least one private cloud.

18. The decentralized system of claim 14 wherein the multi-cloud computing environment comprises at least one public cloud.

19. The decentralized system of claim 14 wherein the multi-cloud computing environment comprises one of virtual machines and containers implemented using a virtualization infrastructure.

20. The decentralized system of claim 19 wherein the virtualization infrastructure comprises one or more hypervisors.

* * * * *

UNITED STATES PATENT AND TRADEMARK OFFICE
CERTIFICATE OF CORRECTION

PATENT NO. : 11,657,164 B2
APPLICATION NO. : 17/031282
DATED : May 23, 2023
INVENTOR(S) : Pengfei Wu et al.

Page 1 of 1

It is certified that error appears in the above-identified patent and that said Letters Patent is hereby corrected as shown below:

In the Claims

Claim 8, Column 15, Line 25, please delete "device causes the given node to perform the steps of:" and insert therefor --device causes a given node to perform the steps of:--

Claim 8, Column 15, Line 26, please delete "sending a request from a given node in a decentralized" and insert therefor --sending a request from the given node in a decentralized--

Signed and Sealed this
Twenty-seventh Day of June, 2023

Katherine Kelly Vidal
*Director of the United States Patent and Trademark Office*